Dec. 16, 1952  U. J. BRUALDI  2,621,691

FRUIT AND VEGETABLE SLICER

Filed July 15, 1950

Inventor

By Ulysses J. Brualdi

Wooster & Davis Attorneys

Patented Dec. 16, 1952

2,621,691

UNITED STATES PATENT OFFICE 2,621,691

FRUIT AND VEGETABLE SLICER

Ulysses J. Brualdi, Ansonia, Conn.

Application July 15, 1950, Serial No. 174,034

4 Claims. (Cl. 146—78)

This invention relates to cutting mechanisms for foods, such as fruits and vegetables, and an object is to provide an improved construction of cutting mechanism arranged for use in slicing, dicing, or otherwise cutting fruits, vegetables and other food materials.

A further object is to provide a portable cutting mechanism for kitchen use constructed and arranged to permit the cutters to be easily removed for cleaning or other purposes and replaced.

With the foregoing and other objects in view, I have devised the construction illustrated in the accompanying drawing. It is, however, to be understood the invention is not limited to the specific details of construction and arrangement shown, but may embody various changes and modifications within the scope of the invention.

Figure 1:
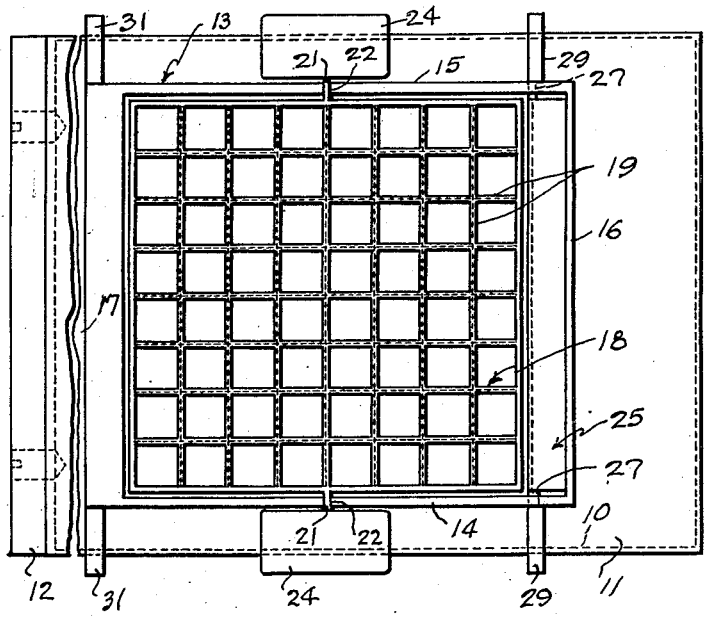
Fig. 1 is a top plan view of a cutting mechanism constructed in accordance with one embodiment of the invention.
Figure 3:
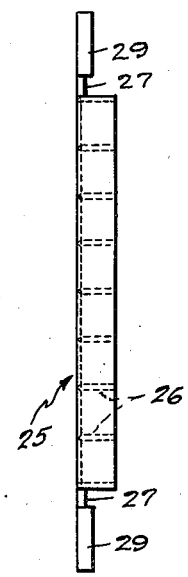
Fig. 3 is a side elevation of one form of slicing cutter used in the illustrated mechanism.

The illustrated embodiment of the invention includes a base 11 formed of wood, metal or other suitable material, but preferably metal recessed on the under side, as shown in dotted lines 10, to reduce material and weight. A holding or positioning strip 12 or the like may, if desired, be secured along one edge of the base 11 for engaging and positioning the base along the edge of a table or other support.

A container 13 for holding an article of food to be cut is firmly mounted on the base 11 in any suitable manner, and has front and rear walls 14, 15 respectively, side walls 16, 17, and an open top. As shown it is formed integral or in one piece with the base 11. As illustrated, a cubing cutter 18 has cutting blades 19 arranged crosswise to form a cubing cutter, for example for cutting sticks for French fries, and oppositely extending arms 21 slidably mounted in parallel vertical slots 22 formed in the front and rear walls 14, 15. The upper ends of the slots 22 at the tops of the walls are open to permit the arms 21 being freely inserted therein. A handle or finger grip 24 secured to each arm 21 is located on the outside of the associated slot for pressing the cutter 18 down through the article of food in the container 13.

Figure 2:
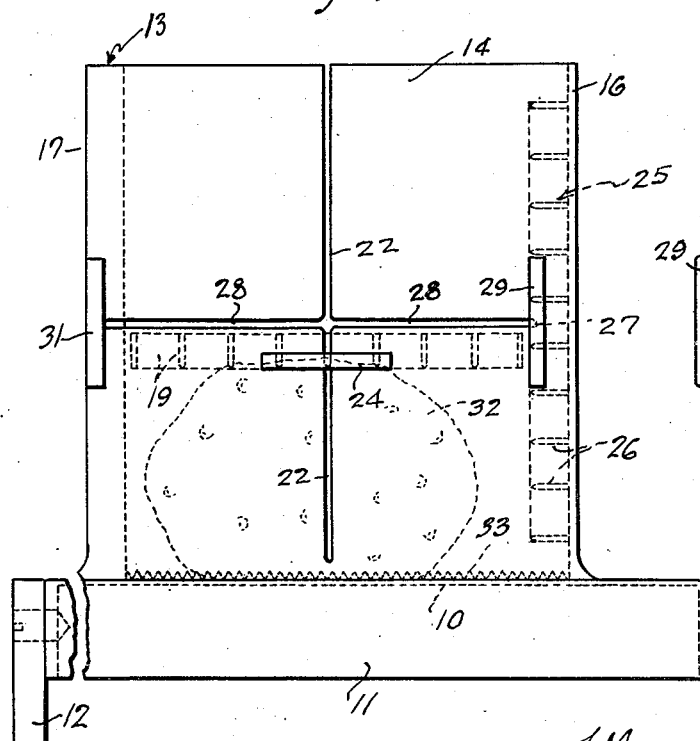
Fig. 2 is a front elevation of the mechanism shown in Fig. 1.
Figure 4:
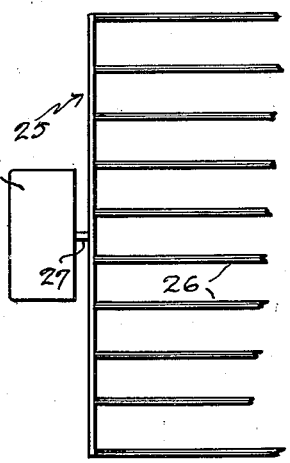
Fig. 4 is a front view of one end portion thereof.

A slicing cutter 25 is formed with a plurality of parallel blades 26 and has oppositely extending arms 27 slidably positioned in parallel horizontal slots 28 in the front and rear walls 14, 15 intersecting the vertical slots 22, as shown in Fig. 2. A handle or finger grip 29 is secured to each arm 27 for sliding the slicing cutter 25 horizontally through the slots 28 to slice an article of food in the container 13. Stationary handles or finger grips 31 are secured to the respective side walls 14, 15 at one end of each slot 28 to assist in operating the horizontally movable cutter 25 by squeezing the handles or grips 29, 31 together.

As shown in Fig. 2, the cubing cutter 18 is of such width relative to the container 13 that it can be moved vertically through the container when the slicing cutter 25 is positioned at the extreme right, as shown in broken lines. Likewise, when the cubing cutter 18 is on the bottom of the container 13, the slicing cutter 25 can be moved above it horizontally across the container.

In operation, an article of food to be cut such, for example, as a potato 32, is placed in the container 13. If cube sticks only are desired, the slicing cutter 25 is pushed to inoperative position at the side and the cubing cutter 18 is pressed downwardly through the article by pressing the handles 24, the arms 21 sliding through the vertical slots 22. If desired, the bottom surface of the container may be roughened somewhat as shown at 33, to prevent the article being cut from sliding sidewise. If it is desired to dice the cube sticks, the cubing cutter 18 is left in the bottom of the container at the end of its cutting stroke and the slicing cutter 25 is moved horizontally through the cube sticks to the left in Fig. 2 by squeezing together the handles 29, 31. When these two cuts have been completed, the container is tilted to empty out the cut particles or cubes. The slicing cutter can then be returned to its starting position, as shown in the drawing, or removed from the container for cleaning by shifting to the center to bring connections 27 in alignment with vertical slots 22 and shifting the cutter upwardly with these connections in the vertical parts of the slots and out the top. The cubing cutter 18 can then be lifted out through the open ends of the slots 22.

When slicing only is desired, the slicer 25 alone is used. If, for example, it is desired to then cut the sliced material in half, an ordinary knife can be used by sliding it down through the vertical slots 22. The cubing cutter 18 is readily removable, and the slicing cutter 25 can also be removed for cleaning or the like by sliding the arms 27 along the horizontal slots 28 and then up through the vertical slots 22. The cutters are interchangeable so that the slicing cutter 25 can be employed in the vertical slots 22, 23 and the cubing cutter 18 in the horizontal slots 28, if desired, and either cutter can be put aside if it is not needed.

The construction is simple, rugged, and easily operated and cleaned, and it provides a long-lived cutting tool having no springs or similar parts to get out of order. The specific structure described can be variously modified and adapted within the scope of the appended claims.

Having thus set forth the nature of my invention, I claim:

1. A fruit and vegetable slicer comprising a container including spaced walls having separate pairs of parallel guide slots arranged at right angles to each other, a cubing cutter including a frame having a plurality of crosswise extending cutters, means supporting said cubing cutter for movement through said container in a determinate direction including oppositely extending arms slidably engaging one of said pairs of slots, a slicing cutter including a frame having a plurality of parallel cutters, and means supporting said slicing cutter for movement through said container in a direction at right angles to the direction of movement of said cubing cutter, including oppositely extending arms slidably engaging the other of said pairs of slots, and handles on said arms for respectively moving said cutter frames through said container.

2. A fruit and vegetable slicer comprising a container having upright spaced side walls, a cubing cutter including a plurality of parallel crosswise extending cutting blades, means supporting said cubing cutter for movement through said container in a determinate direction including aligned slots in said walls and operating means for said cubing cutter comprising hand grips outside the walls with connections to the cutter extending through and guided by said slots, a slicing cutter including a plurality of parallel cutting blades, and means supporting said slicing cutter for movement through said container in a direction at right angles to the direction of movement of said cubing cutter including aligned slots in said walls intersecting said first slots, and operating means for said slicing cutter comprising hand grips outside the walls and connections therefrom to this cutter extending through and guided by said slots.

3. A fruit and vegetable slicer comprising a container having upright spaced side walls, a cubing cutter including a plurality of parallel crosswise extending cutting blades, means supporting said cubing cutter for movement through said container in a determinate direction including aligned vertical slots in said walls and operating means for said cubing cutter extending through and guided by said slots, a slicing cutter including a plurality of parallel cutting blades, and means supporting said slicing cutter for movement through said container in a direction at right angles to the direction of movement of said cubing cutter including aligned horizontal slots in said walls intersecting said vertical slots, and operating means for said slicing cutter extending through and guided by said horizontal slots.

4. A fruit and vegetable slicer comprising a container having upright spaced side walls, a cubing cutter including a plurality of parallel crosswise extending cutter blades, means supporting said cubing cutter for movement through said container in a determinate direction including aligned vertical slots in said walls and operating means for said cubing cutter extending through and guided by said slots, a slicing cutter including a plurality of parallel cutting blades, and means supporting said slicing cutter for movement through said container in a direction at right angles to the direction of movement of said cubing cutter including aligned horizontal slots in said walls intersecting said vertical slots, and operating means for said slicing cutter extending through and guided by said horizontal slots, said vertical slots being open at the top edges of said side walls to permit insertion and removal of said operating means so that said cutters can be assembled and disassembled with said container.

ULYSSES J. BRUALDI.

REFERENCES CITED

The following references are of record in the file of this patent:

UNITED STATES PATENTS

| Number | Name | Date |
| --- | --- | --- |
| 383,892 | Loretz | June 5, 1888 |
| 2,073,257 | Van Riper | Mar. 9, 1937 |
| 2,559,554 | Zahmer et al. | July 3, 1951 |

FOREIGN PATENTS

| Number | Country | Date |
| --- | --- | --- |
| 387,186 | Germany | Dec. 22, 1923 |
| 645,643 | Germany | June 1, 1937 |